United States Patent Office
3,521,865
Patented July 28, 1970

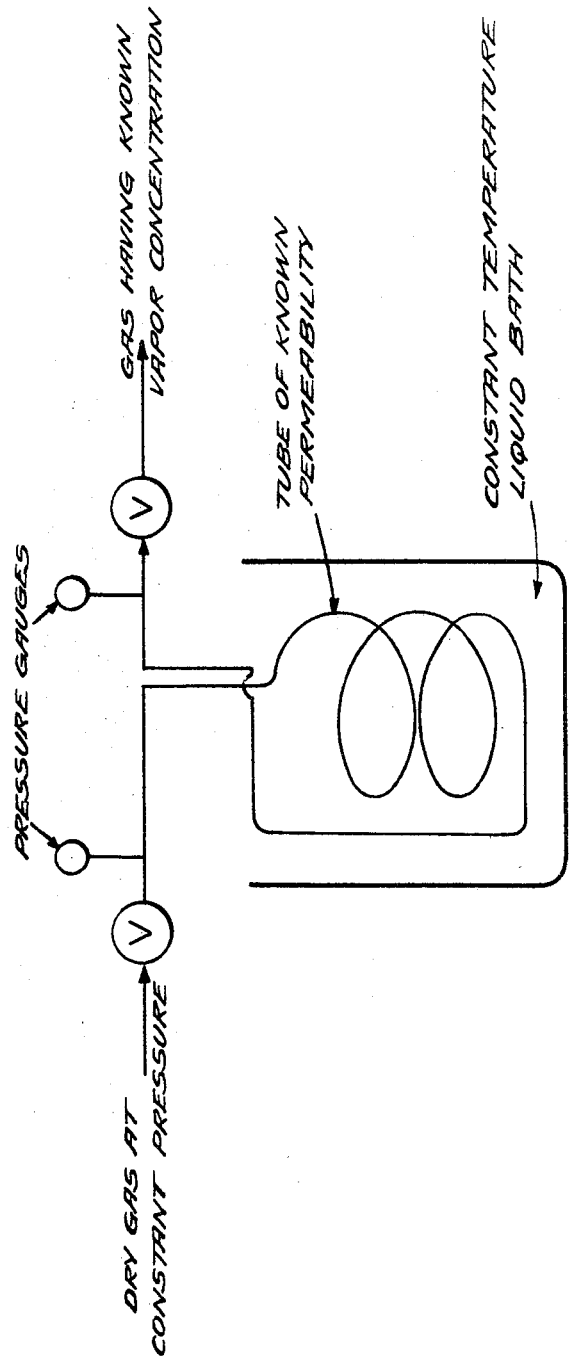

3,521,865
GENERATION OF ACCURATELY KNOWN VAPOR CONCENTRATIONS BY PERMEATION
Jack Kertzman, Newark, Del., assignor to E. I. du Pont de Nemours and Company, Wilmington, Del., a corporation of Delaware
Filed May 20, 1968, Ser. No. 730,487
Int. Cl. G01n 1/22, 31/00
U.S. Cl. 261—95            11 Claims

ABSTRACT OF THE DISCLOSURE

Gas having a known vapor concentration is obtained by passing substantially dry gas through a tube of known permeability when the tube is immersed in a fluid of known temperature.

BACKGROUND OF THE INVENTION

Field of the invention

This invention relates to an improved method and apparatus for producing gas having an accurately known vapor concentration. Such a gas is useful in the calibration of gas analyzers.

The method and apparatus of this invention are of the type in which a material contacts one side of a membrane having a known permeability to that material, permeates the membrane, and diffuses into a diluent material on the other side of the membrane. In the instant invention the permeating material surrounds the outside of a permeable tube, permeates the tube, and diffuses into a gas flowing through the tube.

Description of the prior art

Known methods of producing low concentrations of one gas in another include direct volumetric or gravimetric dilution, diffusion in tortuous channels, linear steady state diffusion in tubes of precisely known dimensions, and diffusion of a liquid through the walls of a tube in which it is contained. The latter method is most analogous to that of the instant invention; however, it has several disadvantages. Seals at the tube ends often leak and cause serious error in determining the rate of permeation and in producing gaseous mixtures of known concentration once the rate of permeation has been determined. In addition, the temperature of the system must be controlled by keeping the gas, which flows around the liquid filled tube, at a constant temperature. Controlling the gas temperature and attaining equilibrium conditions are especially difficult in the said prior art method when one attempts to produce a range of vapor concentrations at sufficiently high gas flow rates since the length of tubing required necessitates a large space for the surrounding gas.

The instant invention has several distinct advantages over the prior art. There is no practical necessity for having seals in the area where diffusion takes place. The temperature of the system is determined by the temperature of the liquid bath, which is easily held constant. A wide range of vapor concentrations may be produced easily and with repeatability since there is no large quantity of gas to be handled, and there are no transient local variations in the mass transfer rate due to unevenness of gas flow. In addition, various levels of vapor concentration may be produced with one source of gas and one liquid bath by merely having different lengths of tubing immersed in the same liquid bath and connected to the same source of gas. The foregoing are only a few of the advantages inherent in the instant invention.

SUMMARY OF THE INVENTION

The apparatus of this invention comprises a flexible plastic tube of known length and permeability connected to a source of gas, and a body of fluid in contact with the tube. The method of practicing the invention comprises passing dry gas through the tube at a known flow rate and immersing the tube in the body of fluid, whereby the gas picks up a determinable amount of vapor from the fluid that permeates the tube wall. The amount of vapor picked up by the gas may be determined by a gravimetric analysis performed with the tube that is used or by prior knowledge of the permeability of that type of tubing under the same conditions. The permeability of various kinds of tubing has been found to remain constant even after prolonged use. The gas so produced has an accurately known vapor concentration; its uses include, but are not limited to, the calibration of a gas analyzer.

BRIEF DESCRIPTION OF THE DRAWINGS

The drawing is a schematic respresentation of the apparatus of this invention. The bath may also be sealed at the top to facilitate the use of gaseous fluids such as steam as the source of vapor.

DESCRIPTION OF THE PREFERRED EMBODIMENT

The preferred embodiment consists of a tube of known permeability immersed in a constant temperature water bath and a source of dry gas connected thereto. The dry gas passes into one end of the tube, flows through the tube wherein it picks up vapor from the water that permeates the tube wall, and leaves the other end of the tube. Preferably the tube is equipped with a valve and pressure gauge at each end to facilitate maintaining the gas pressure and flow rate constant. This apparatus was developed for generating gas streams of known water vapor concentration for calibration of a moisture analyzer.

The preferred method of practicing the invention comprises immersing a tube of known permeability in a constant temperature water bath and discharging a dry gas into one end of the tube from a source of gas such as a compressed air cylinder. The end of the tube from which the gas of known vapor concentration exits, is then directed to the point of use, such as the sensing zone of a moisture analyzer. The permeation of the water through the tube wall should be brought to equilibrium before using the gas produced by this method by simultaneously conducting the immersing and discharging steps for 16 to 72 hours.

The operation of the moisture generator described is based on the controlled and reproducible permeation of water through a tube into a dry air stream flowing within the tube. The concentation of water vapor in the gas flowing out of the end of the tube is determined by the permeability of the material of which the tube is made, the pressure of the water, the pressure of the gas, the temperature of the system, the gas flow rate, the tube wall thickness and the tube length.

The tube may be constructed of a wide variety of materials. Hydrophilic materials, such as nylon, modified vinyls, and silicones, generally have higher permeation values than hydrophobic materials, such as perfluorinated hydrocarbons, polyethylene, and polypropylene. The mechanism of permeation in hydrophobic and hydrophilic materials is different; in addition, hydrophilic tubing usually contains water soluble material which must be removed. Nevertheless, both hydrophobic and hydrophilic tubing have been used successfully.

Although the pressure and temperature of the gas and water, as well as the gas flow rate, have a direct effect on the moisture concentration of the gas which is produced, the use of multiple tubes has been chosen as the means to enable wide-range concentration programming. A multiplicity of tubes of various materials, and having different lengths and/or wall thicknesses, have been used to produce a moisture concentration range of from 5 p.p.m. to 3000 p.p.m. by volume. Producing various moisture concentrations by merely switching the gas inlet from tube to tube has proved advantageous in programming a gas generator for automatic and rapid wide-range production of moisture concentrations.

The apparatus described yields repeatable results. Continuous measurement of the water vapor concentrations with a Du Pont 510 Moisture Analyzer showed that the moisture level produced with repeatable to within better than ±2% by volume at 25 p.p.m. and better than ±3% by volume over a range of 250 to 1500 p.p.m. for both short-term and long-term use. The accuracy of these measurements was checked by gravimetric analysis. A weighing train of 3 Nesbitt tubes were packed with granular phosphorous pentoxide, a desiccant material. The weight of water collected in the weighing tubes over a known period of time for a known gas flow rate is the primary measure of the moisture concentration of the gas produced. Analysis by this technique shows that the above measurements with the Du Pont 510 Moisture Analyzer were accurate to ±1% by volume at 2000 p.p.m. and ±2% to ±5% by volume from 25 to 1000 p.p.m.

Before practicing the invention, water soluble materials should be extracted from the tube by immersing it in a water bath for several days while dry gas passes through the tube. The length of time needed to perform the extraction depends on the type of material of which the tube is made.

The permeability of the tube may be determined by a gravimetric analysis. If very uniform tubing is available, one piece of tube may be so measured and other tubes may be simply cut to the proper length to obtain the desired moisture concentration; this would greatly lower the cost of fabricating moisture generators of the type described. If the tube has been dried after extraction, it must be used under operating conditions for 16 to 72 hours for equilibrium conditions to be attained. After the moisture concentration of the gas issuing from the tube at specified operating conditions has been determined, the tube may be used as a standard source of gas having the moisture concentration determined. The permeability of the tube may be expressed in terms of unit surface area, or, more conveniently, by the moisture concentration of gas having passed through it under specified conditions. The identical procedure performed on other tubes of various lengths, and immersion of these tubes in a common water bath, with an appropriate gas switching device provide a moisture generator capable of producing a wide range of moisture concentrations. A single tube generator is ideally suited for field use as a single point calibrator.

Variations in the described method and apparatus, as well as the use of same with materials other than water as the vapor source and for purposes other than the calibration of a moisture analyzer, will be apparent to those skilled in the art.

I claim:

1. An apparatus for producing a known concentration of vapor in a gas, comprising a tube of known permeability immersed in a constant temperature liquid bath, the ends of said tube extending out of said bath, and means for regulating the flow of gas through said tube comprising at least one pressure gauge and at least one flow valve operably connected to said tube.

2. The apparatus of claim 1, wherein said liquid is water.

3. The apparatus of claim 1, wherein said tube is made of a polymeric material.

4. The apparatus of claim 3, wherein said material is selected from the group of hydrophilic materials consisting of polyamides, polyvinyls, and polysiloxanes.

5. The apparatus of claim 3, wherein said material is selected from the group of hydrophobic materials consisting of polyethylene, polypropylene, and perfluorinated hydrocarbon polymers.

6. The apparatus of claim 1, wherein the permeability of said tube is known to be within a range, neither of the extremes of said range deviating from the actual permeability by more than 5% of the actual permeability.

7. The method of producing a known concentration of vapor in a gas, comprising, flowing gas through a tube of known permeability immersed in a constant temperature liquid bath, the ends of said tube extending out of said bath, and removing said gas from said tube, said gas having a known concentration of the vapor of said liquid.

8. The method of claim 7, wherein equilibration is effected by conducting said flowing and said removing for a period of about 16 hours to about 72 hours prior to producing a known concentration of vapor in said gas.

9. The method of claim 7, wherein said gas is purified before flowing through said tube.

10. The method of claim 9, wherein said purification comprises drying.

11. The method of claim 7 wherein said liquid is water.

References Cited

UNITED STATES PATENTS

| | | | |
|---|---|---|---|
| 2,048,694 | 7/1936 | Harris | 261—99 X |
| 2,530,716 | 11/1950 | Meynier | 261—99 X |
| 2,807,505 | 9/1957 | Weitzel | 239—145 |
| 2,864,506 | 12/1958 | Hiskey | 210—321 |
| 3,403,531 | 10/1968 | Oesterheld. | |
| 3,423,491 | 1/1969 | McLain et al. | 210—500 X |

OTHER REFERENCES

Cutting: "A Simple Appr. for Calibration of Hygrometers," Journal of Scientific Instruments, vol. 30, September 1953, pp. 338, 339.

Brombacher et al.: "Fundamental Techniques for Calibrating Hygrometers," Instrumentation, vol. 5, No. 6, 1st qtr., 1952, pp. 25–28.

Wexler: "Divided Flow . . . Apparatus," Research Paper, vol. 40, June 1948, pp. 479–486.

TIM R. MILES, Primary Examiner

U.S. Cl. X.R.

48—144, 219; 73—1, 29; 239—145; 261—96, 99